(12) United States Patent
Kwak

(10) Patent No.: US 12,238,834 B2
(45) Date of Patent: Feb. 25, 2025

(54) LIGHT DRIVING APPARATUS AND METHOD FOR DRIVING SAME

(71) Applicant: LG INNOTEK CO., LTD., Seoul (KR)

(72) Inventor: Dong Yun Kwak, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 148 days.

(21) Appl. No.: 18/029,952

(22) PCT Filed: Oct. 8, 2021

(86) PCT No.: PCT/KR2021/013858
§ 371 (c)(1),
(2) Date: Apr. 3, 2023

(87) PCT Pub. No.: WO2022/075798
PCT Pub. Date: Apr. 14, 2022

(65) Prior Publication Data
US 2023/0380033 A1 Nov. 23, 2023

(30) Foreign Application Priority Data
Oct. 8, 2020 (KR) .................. 10-2020-0130469

(51) Int. Cl.
*H05B 45/34* (2020.01)
*H05B 45/14* (2020.01)
(Continued)

(52) U.S. Cl.
CPC ........... *H05B 45/325* (2020.01); *H05B 45/14* (2020.01); *H05B 45/34* (2020.01); *H05B 47/16* (2020.01)

(58) Field of Classification Search
CPC ...... H05B 45/325; H05B 45/34; H05B 45/14; H05B 47/16
See application file for complete search history.

(56) References Cited

U.S. PATENT DOCUMENTS

2012/0181931 A1  7/2012 Katsura
2013/0147355 A1  6/2013 Min et al.
(Continued)

FOREIGN PATENT DOCUMENTS

JP          5291527       9/2013
KR    10-2010-0117279    11/2010
(Continued)

OTHER PUBLICATIONS

International Search Report dated Jan. 5, 2022 issued in Application No. PCT/KR2021/013858.
(Continued)

*Primary Examiner* — Henry Luong
(74) *Attorney, Agent, or Firm* — KED & ASSOCIATES, LLP

(57) ABSTRACT

A light driving apparatus according to an embodiment includes a light part; a first sensing part configured to sense an input current value of the light part; a second sensing part configured to sense an output voltage value of the light part; and a control part configured to sense the output voltage value through the second sensing part based on the input current value sensed through the first sensing part and determine a state of the light part based on the output voltage value; wherein the control part is configured to start a sensing operation of the output voltage value through the second sensing part after a first de-bouncing time has elapsed from a start point in which current is applied to the light part, and stop the sensing operation of the output voltage value through the second sensing part before a second de-bouncing time from an end point at which the current applied to the light part is blocked.

20 Claims, 12 Drawing Sheets

(51) Int. Cl.
*H05B 45/325* (2020.01)
*H05B 47/16* (2020.01)

(56) References Cited

U.S. PATENT DOCUMENTS

2013/0147361 A1* 6/2013 Kang .................. H05B 47/24
315/122
2020/0339034 A1 10/2020 Kikuchi et al.
2021/0227653 A1 7/2021 Takagi et al.

FOREIGN PATENT DOCUMENTS

| KR | 10-2013-0063863 | 6/2013 |
| KR | 10-2013-0063879 | 6/2013 |
| KR | 10-2013-0121598 | 11/2013 |
| KR | 10-2014-0070126 | 6/2014 |
| WO | WO 2019/064695 | 4/2019 |
| WO | WO 2019/139021 | 7/2019 |

OTHER PUBLICATIONS

European Search Report issued in Application No. 21878048.4 dated Mar. 18, 2024.

* cited by examiner

[FIG. 1]
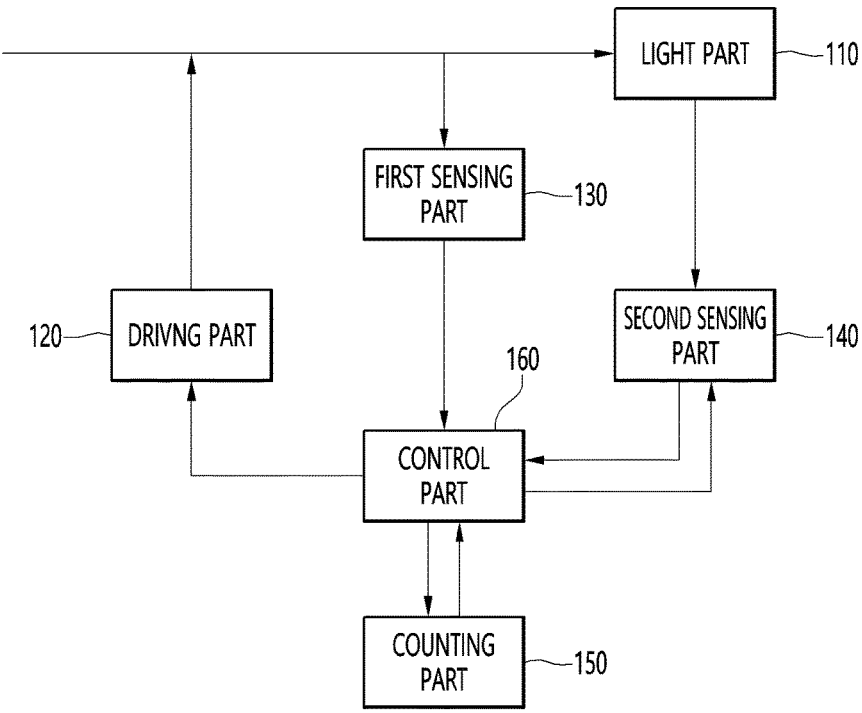
[FIG. 2]
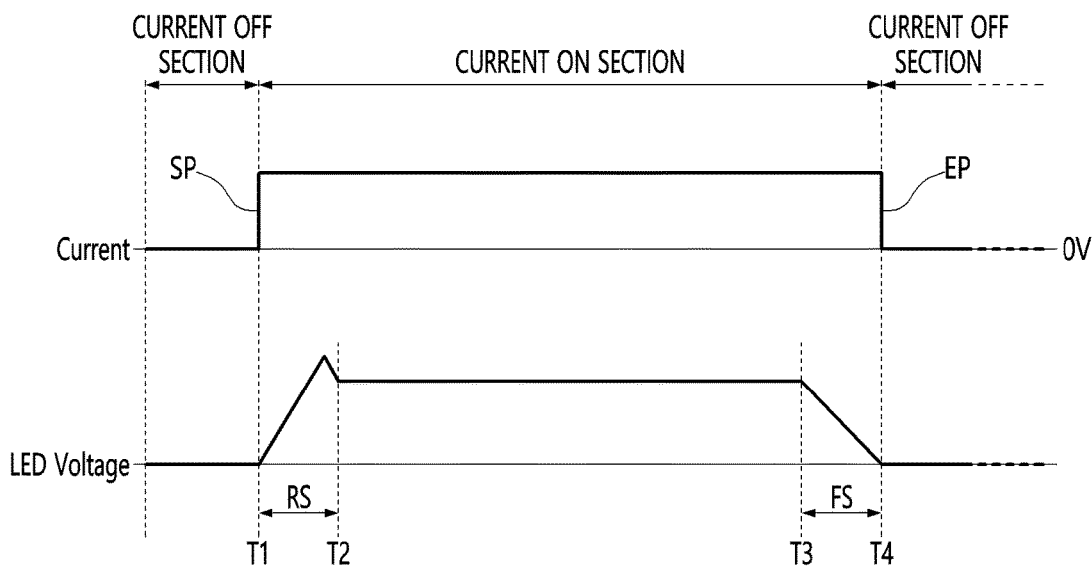

[FIG. 3]
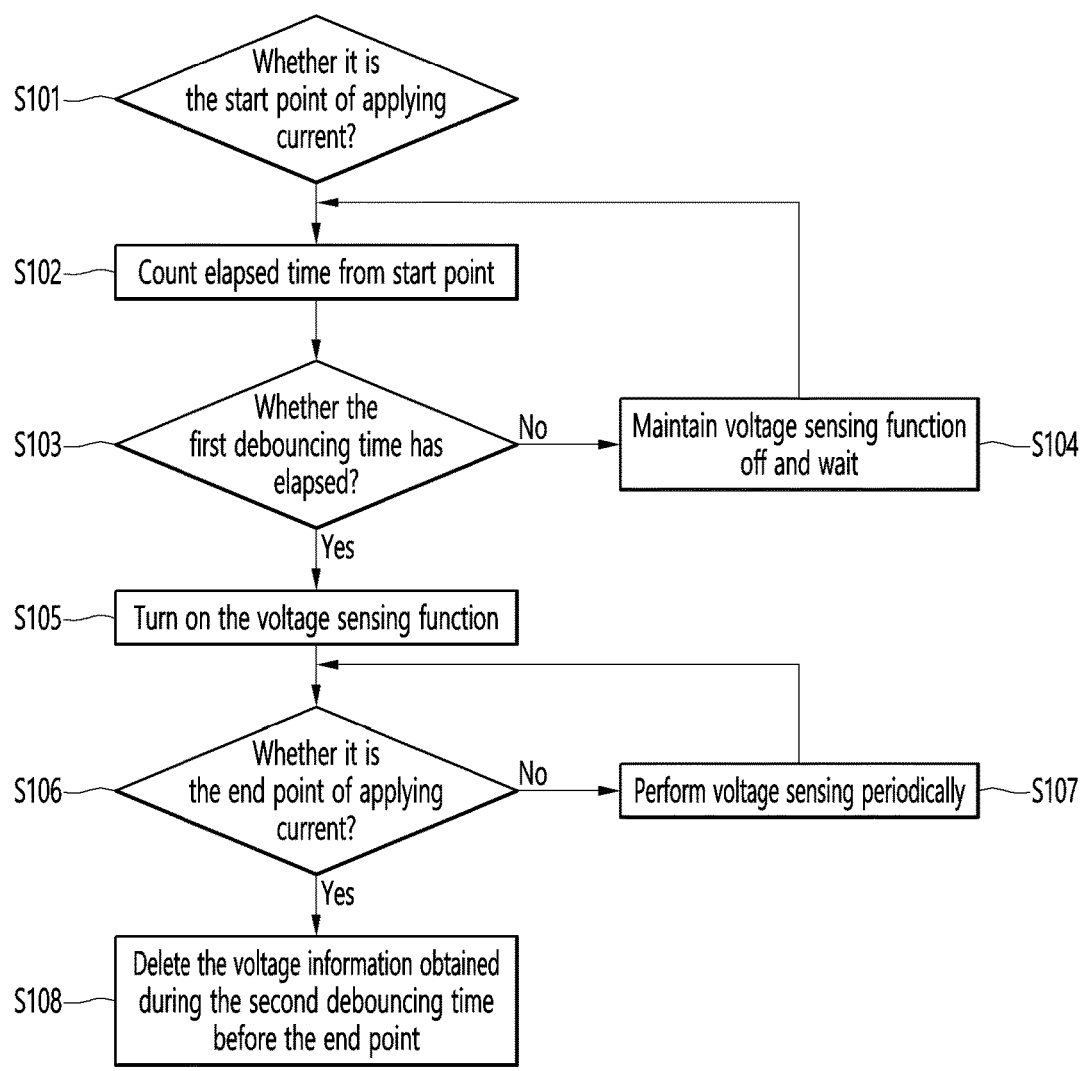

[FIG. 4]
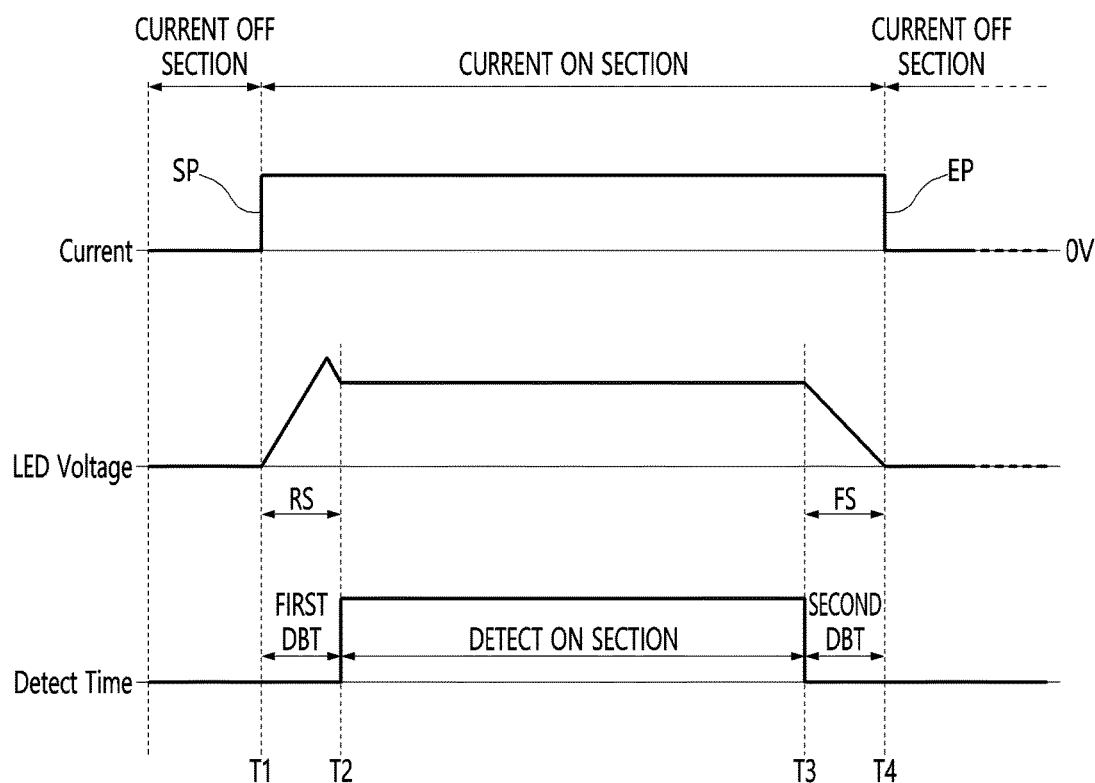

[FIG. 5]
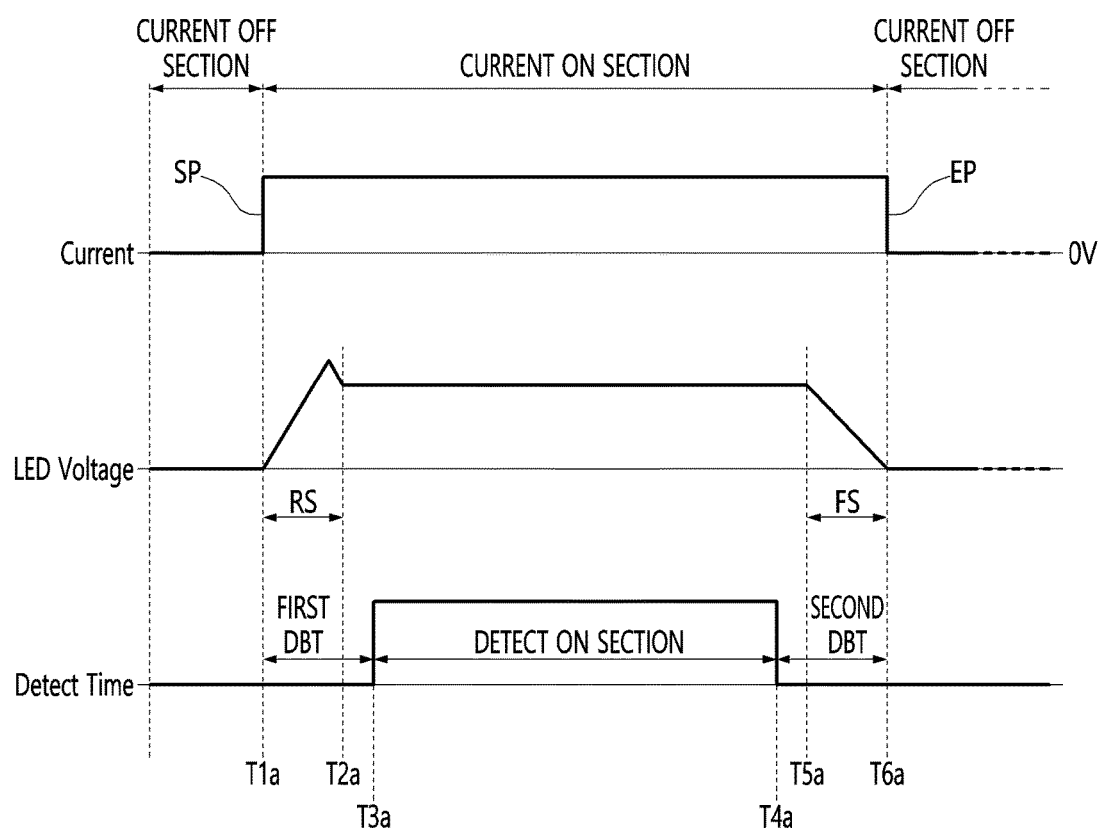

[FIG. 6]
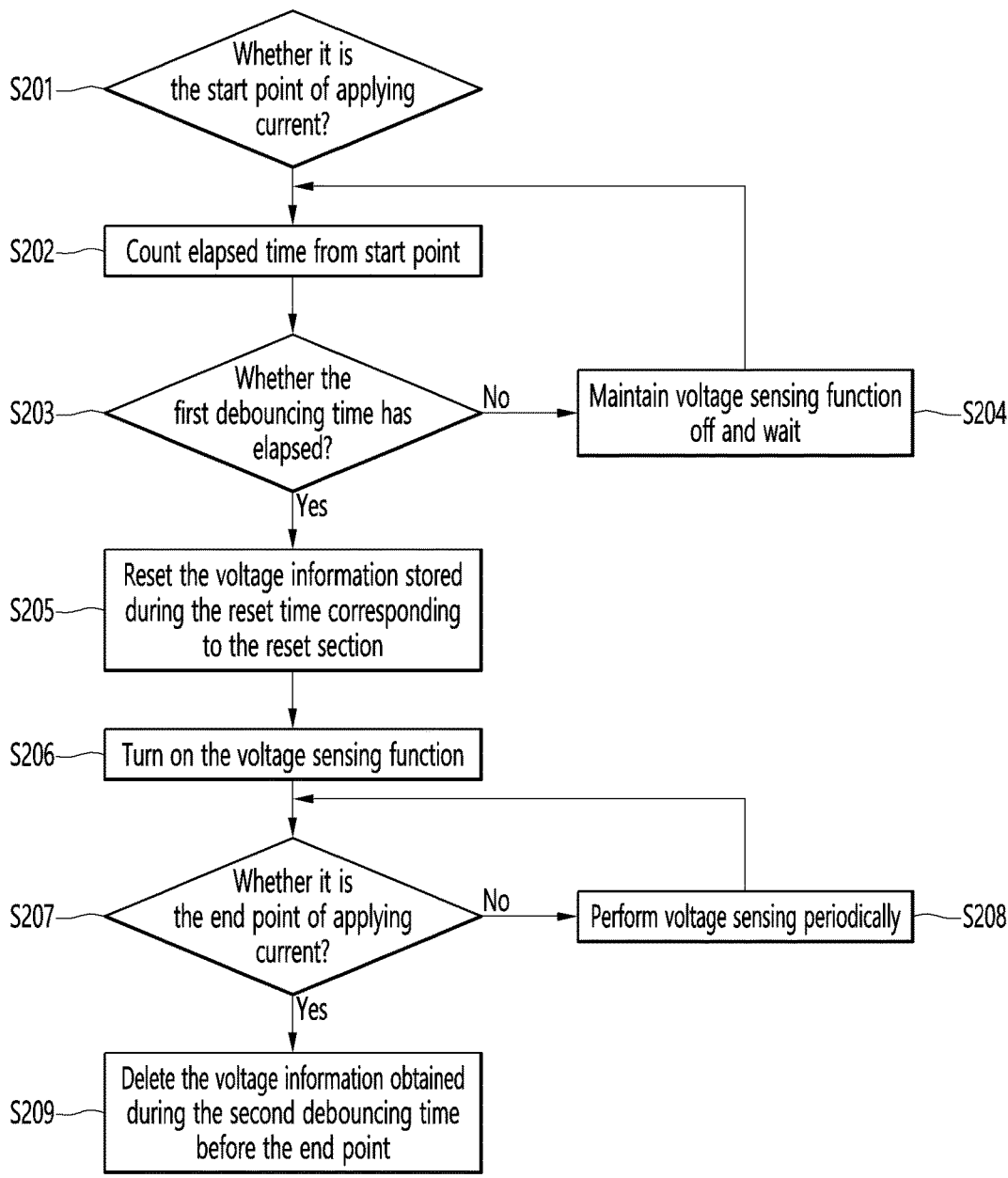

[FIG. 7]
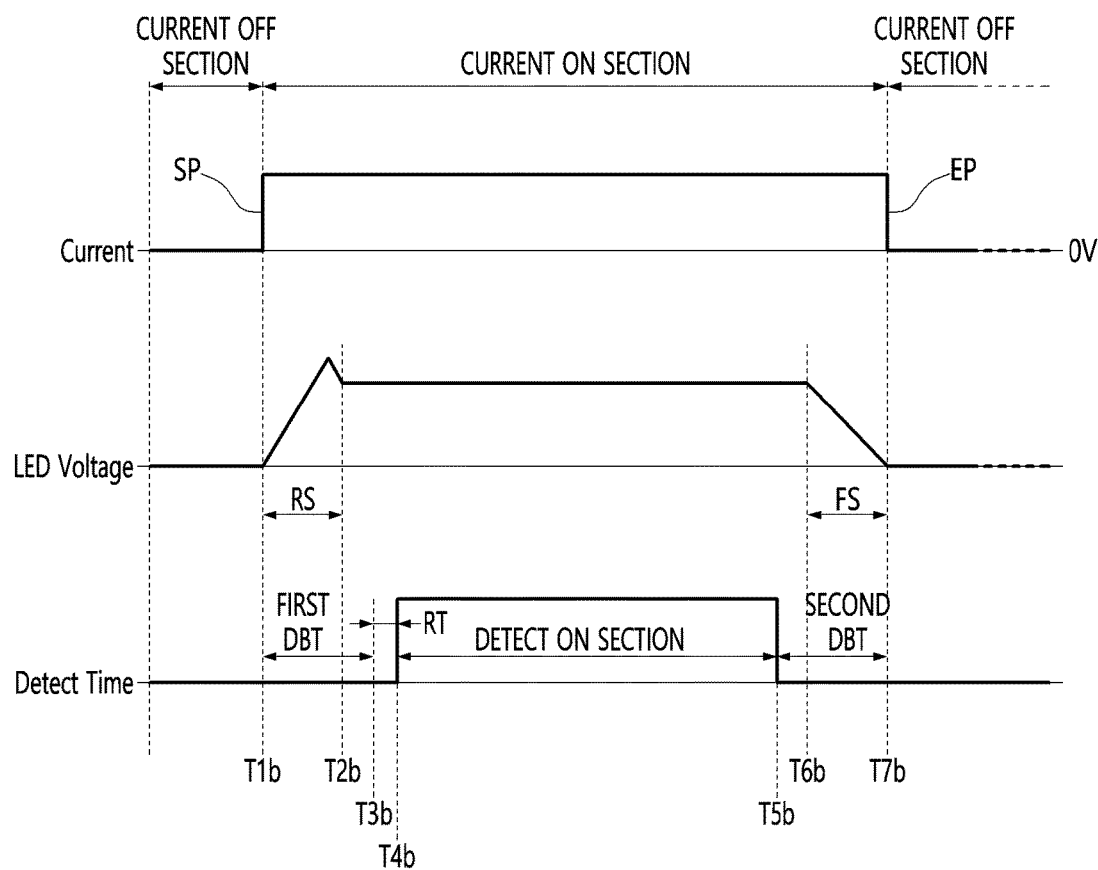

[FIG. 8]
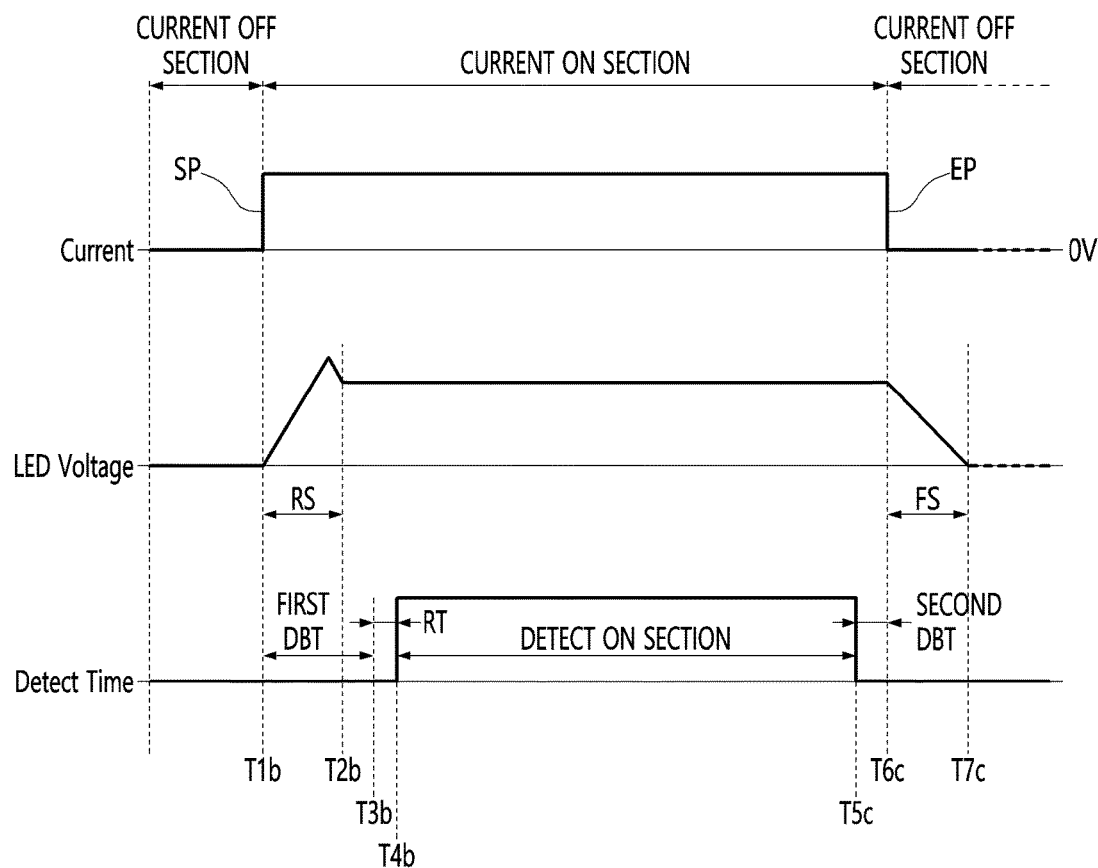

[FIG. 9]
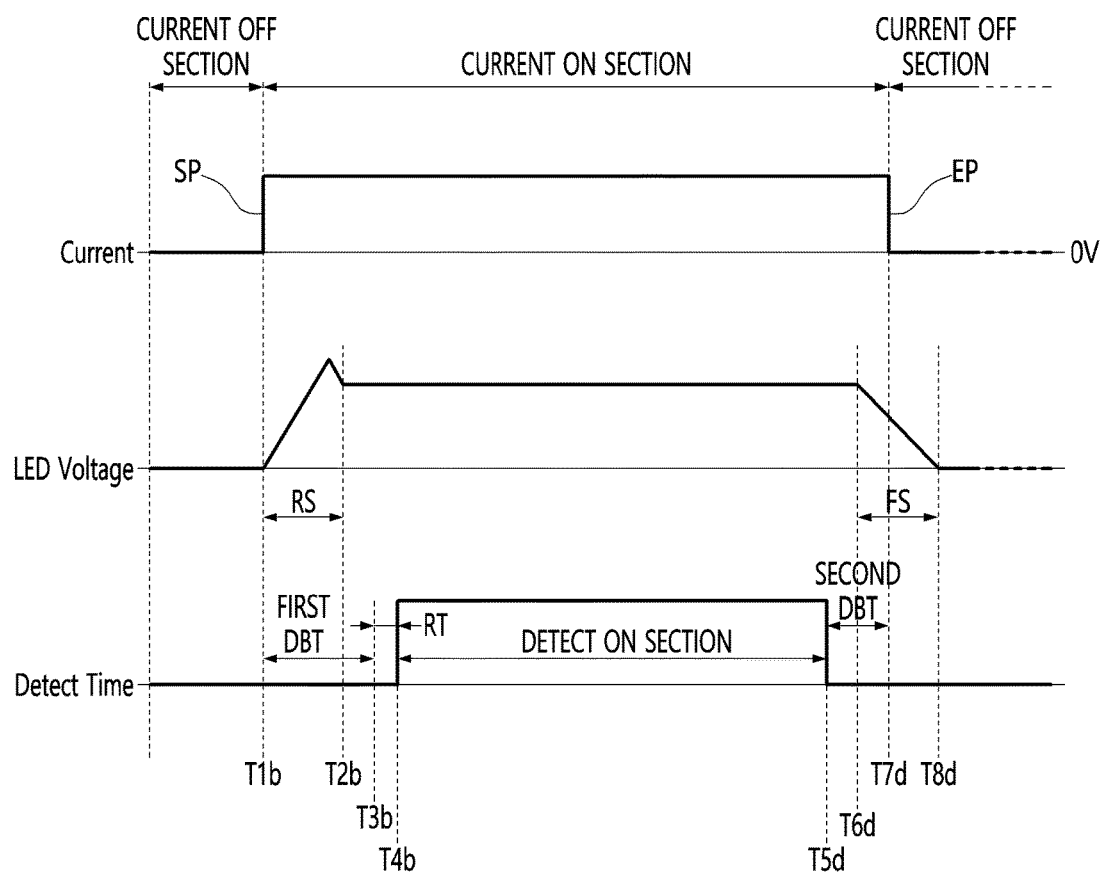

[FIG. 10]
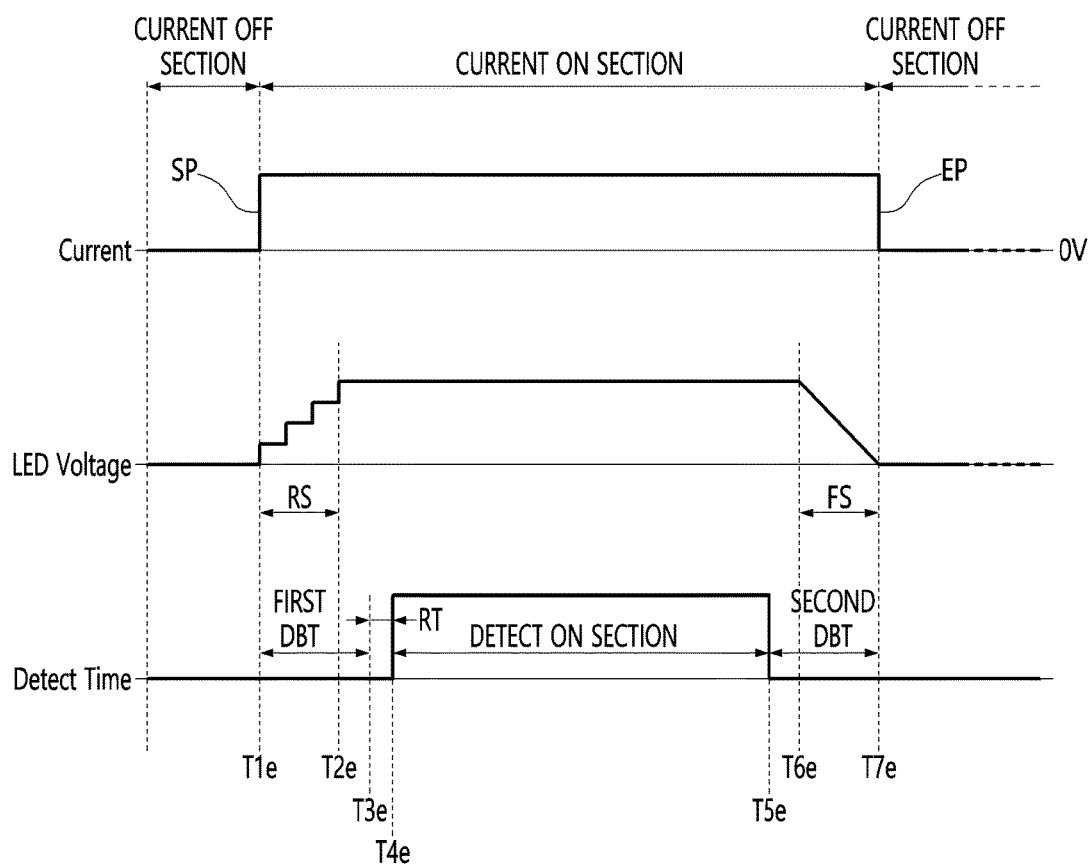

[FIG. 11]
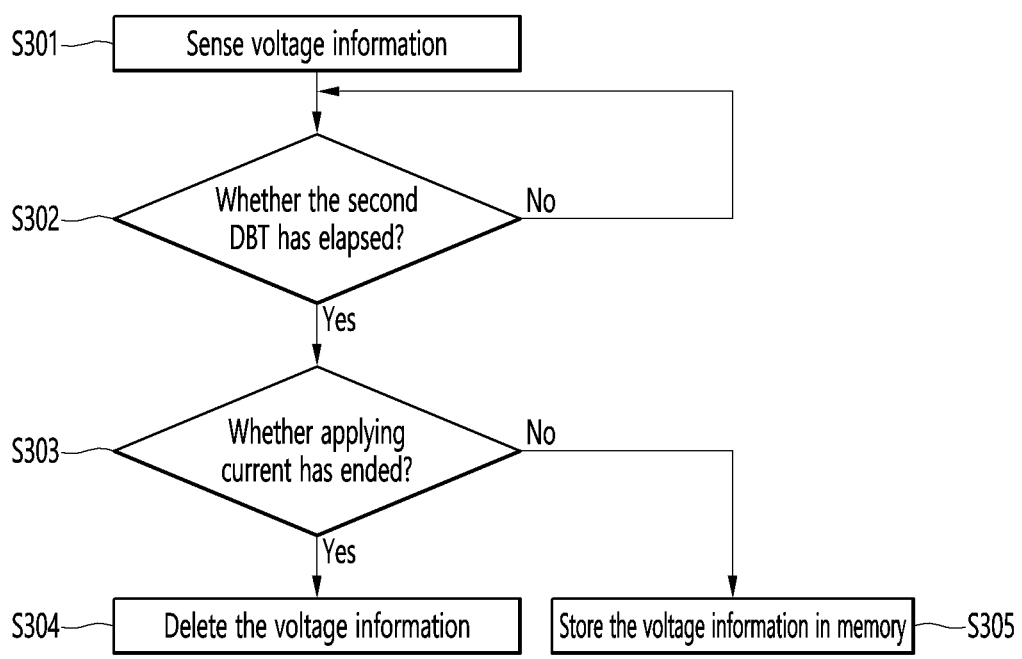

【FIG. 12】
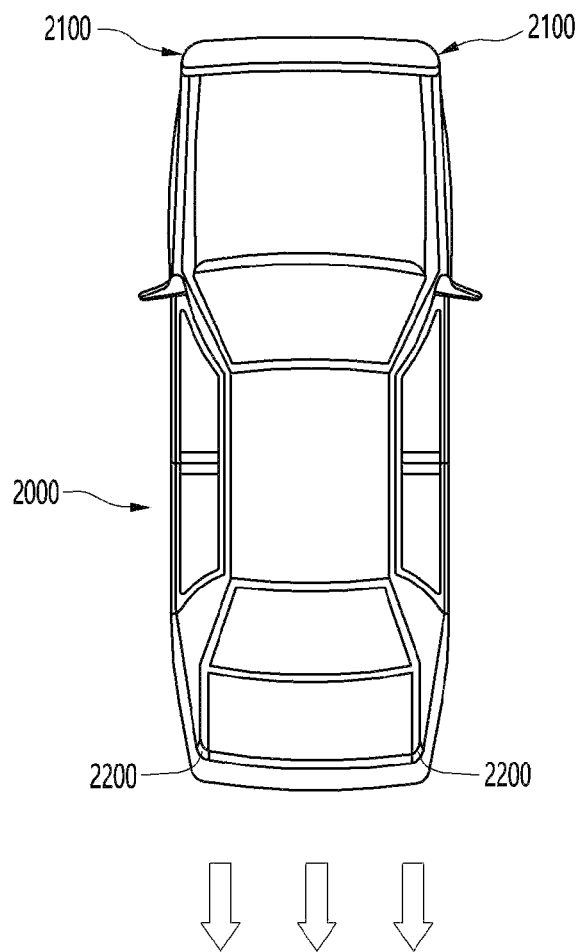

【FIG. 13】
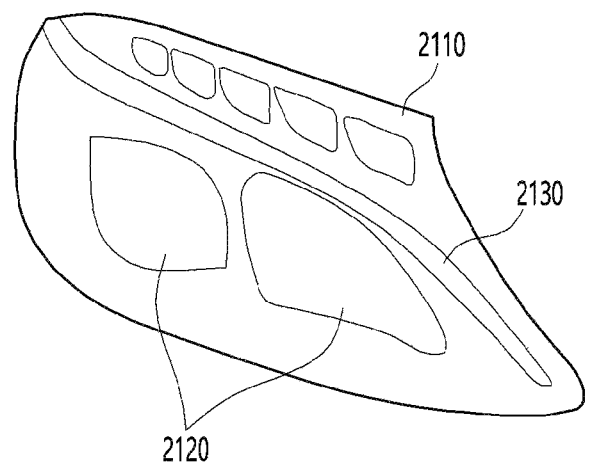
【FIG. 14】
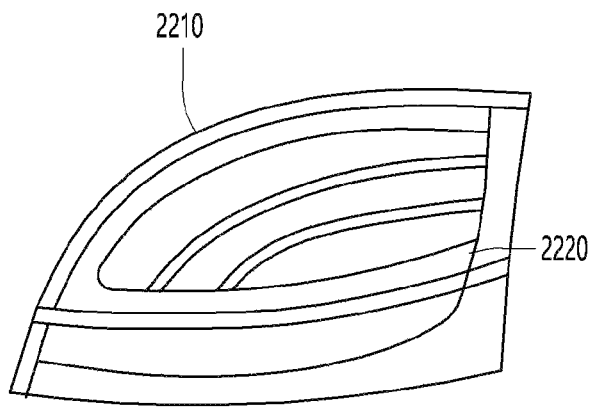

LIGHT DRIVING APPARATUS AND METHOD FOR DRIVING SAME

CROSS-REFERENCE TO RELATED PATENT APPLICATIONS

This application is a U.S. National Stage Application under 35 U.S.C. § 371 of PCT Application No. PCT/KR2021/013858, filed Oct. 8, 2021, which claims priority to Korean Patent Application No. 10-2020-0130469, filed Oct. 8, 2020, whose entire disclosures are hereby incorporated by reference.

TECHNICAL FIELD

An embodiment relates to a light driving device, particularly to a light driving device capable of improving a voltage sensing error occurring in a voltage bouncing section and a method for driving same.

BACKGROUND ART

A light device is a device capable of supplying light or adjusting the amount of light and is used in various fields. For example, the light device may be applied to various fields such as a vehicle and a building to illuminate an interior or exterior.

In particular, recently, a light emitting device has been used as a light source for lighting. Such a light emitting device, for example, a light emitting diode (LED), has advantages such as low power consumption, semi-permanent lifespan, fast response speed, safety, and environmental friendliness compared to conventional light sources such as fluorescent lamps and incandescent lamps. Such light emitting diodes are applied to various optical assemblies such as various display devices and indoor or outdoor lights.

In general, a lamp of various colors and shapes is applied to a vehicle, and recently, lamps employing light emitting diodes have been proposed as light sources for vehicles. For example, light emitting diodes are applied to a head lamp, a tail lamp, a turn signal lamp, a daytime running lamp, and a side lamp of the vehicles. This lamp senses a voltage applied to the light emitting diode, and senses an abnormal state such as short or open of the light emitting diode using the sensed voltage.

In this case, a driving device for controlling the driving of the lamp as described above controls the light emitting diode by receiving PWM (Pulse Width Modulation) type current from a power supply unit (not shown) and supplying the current to the light emitting diode. In this case, a brightness of the light emitting diode may be controlled by adjusting a strength of the applied current.

However, a voltage of the light emitting diode increases or decreases with a certain slope due to circuit characteristics such as a reactor, a capacitor, and a resistor disposed between the power supply unit and the driving device. For example, the voltage of the light emitting diode has a characteristic of gradually increasing during a first voltage bouncing time with a predetermined slope in a current supply section where current is supplied to the light emitting diode. For example, the voltage of the light emitting diode has a characteristic of gradually decreasing during a second voltage bouncing time in a current block section in which current supplied to the light emitting diode is blocked.

Here, the driving device senses a voltage of the light emitting diode when a certain current or more is supplied to the light emitting diode, and thus detects an abnormal state such as a short circuit or open of the light emitting diode. Here, when a certain current or more is supplied to the light emitting diode, the driving device senses the voltage of the light emitting diode and accordingly detects an abnormal state such as a short or open of the light emitting diode. However, a conventional driving device detects the voltage of the light emitting diode at the first voltage bouncing time or the second voltage bouncing time in the current supply section or current block section, and accordingly, there is a problem of erroneously sensing a light emitting diode in a normal state as an abnormal state such as a short state or an open state.

Accordingly, there is a need for a light driving device and a method for driving the same capable of solving the above problems.

DISCLOSURE

Technical Problem

An embodiment provides a light driving apparatus capable of resolving an error due to erroneous sense of a voltage of a light part that occurs at a start point which current is applied or at an end point which the current is blocked, and a method for driving the same.

In addition, the embodiment provides a light driving apparatus capable of turning off the voltage sensing function of the light part during a first de-bouncing time set based on the start time when current is applied to the light part and a method for driving the same.

In addition, the embodiment provides a lighting driving apparatus capable of turning off the voltage sensing function of the light part during a second de-bouncing time set based on the end point at which the current applied to the light part is blocked, and a method for driving the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A light driving apparatus according to an embodiment includes a light part; a first sensing part configured to sense an input current value of the light part; a second sensing part configured to sense an output voltage value of the light part; and a control part configured to sense the output voltage value through the second sensing part based on the input current value sensed through the first sensing part and determine a state of the light part based on the output voltage value; wherein the control part is configured to start a sensing operation of the output voltage value through the second sensing part after a first de-bouncing time has elapsed from a start point in which current is applied to the light part, and stop the sensing operation of the output voltage value through the second sensing part before a second de-bouncing time from an end point at which the current applied to the light part is blocked.

In addition, the output voltage of the light part includes a rising section that gradually increases in response to the start point at which current starts to be applied to the light part, and wherein a point at which the first de-bouncing time elapses is later than a point at which the rising section ends.

In addition, the output voltage of the light part includes a falling section that gradually decreases in response to the end point at which the current applied to the light part is blocked, and wherein a point before the second de-bouncing time from the end point is earlier than a point at which the falling section starts.

In addition, a start point of the falling section is earlier than the end point at which the current applied to the light part is blocked.

In addition, when the first de-bouncing time elapses, the control part is configured to start a sensing operation of the output voltage value through the second sensing part after a preset reset time.

In addition, the control part is configured to reset voltage information previously stored in a memory during the reset time.

In addition, the control part is configured to store voltage information corresponding to the sensed output voltage value in a memory and delete information stored during the second de-bouncing time before the end point among information stored in the memory when the end point at which the current applied to the light part is blocked arrives.

In addition, the control part is configured to obtain voltage information corresponding to the output voltage value through the second sensing part, update the obtained voltage information in a memory when the end point arrives after the second de-bouncing time has elapsed from a point of obtaining the voltage information, and delete the obtained voltage information when the end point arrives before the second de-bouncing time elapses from a point of obtaining the voltage information.

In addition, the light driving apparatus further includes a count part configured to count an elapsed time from the start point according to a control of the control part and count an elapsed time from a point at which the output voltage value of the light part is sensed through the second sensing part.

On the other hand, a method for driving a light according to the embodiment incudes sensing an input current value of a light part; counting a first elapsed time from a start point at which current is applied to the light part based on the sensed input current value; sensing an output voltage value of the light part when the first elapsed time passes a predetermined first de-bouncing time; counting a second elapsed time from when the output voltage value is sensed; determining an end point at which the current applied to the light part is blocked based on the input current value of the light part; deleting voltage information corresponding to the sensed output voltage value when the end point arrives before the second elapsed time elapses a predetermined second de-bouncing time; and updating voltage information corresponding to the sensed output voltage value in a memory when the end point arrives after the second elapsed time elapses the second de-bouncing time.

In addition, the output voltage of the light part includes a rising section that gradually increases in response to the start point at which current starts to be applied to the light part, and wherein a point at which the first de-bouncing time elapses is later than a point at which the rising section ends.

In addition, the output voltage of the light part includes a falling section that gradually decreases in response to the end point at which the current applied to the light part is blocked, and wherein a point before the second de-bouncing time from the end point is earlier than a point at which the falling section starts.

In addition, a start point of the falling section is earlier than the end point at which the current applied to the light part is blocked.

In addition, the method further includes resetting voltage information previously stored in a memory during a preset reset time when the first elapsed time passes the first de-bouncing time.

Advantageous Effects

The embodiment may more accurately sense a state of the light part. Specifically, the embodiment prevents a sensing operation of an output voltage of the light part in a rising section at a start point where the current is applied to the light part and a falling section at an end point where the applied current is blocked. Accordingly, the embodiment can solve a sensing error problem that may occur as the output voltage of the light part is sensed in the rising section and the falling section, and thereby improve reliability.

In addition, the embodiment may provide a lighting driving device applicable in various environments. That is, the embodiment stops the sensing operation of the output voltage of the light part during a first DBT longer than a time of the rising section at the start point at which the current is applied to the light part. In addition, the embodiment stops the sensing operation of the output voltage of the light part during a second DBT longer than a time of the falling section at the end point at which the applied current is blocked. Accordingly, the embodiment can solve a reliability problem that occurs as the rising section or falling section changes in various environments.

In addition, the embodiment may provide a more improved sense function by including a reset section. That is, the embodiment does not immediately start the sensing function of the output voltage of the light part at a point at which the first DBT has passed, but resets the previously stored data for a predetermined reset time based on a point at which the first DBT has passed. Accordingly, the embodiment can further improve the reliability of the sensing function of the light part.

DESCRIPTION OF DRAWINGS

FIG. 1 is a block diagram showing a configuration of a light driving apparatus according to an embodiment.

FIG. 2 is a view showing a relationship between an input current of a light part and an output voltage of a light part according to an embodiment.

FIG. 3 is a flowchart showing a method of driving a light driving apparatus step by step according to an embodiment.

FIG. 4 is a view for explaining a voltage sensing operation of FIG. 3 according to a first embodiment.

FIG. 5 is a diagram for explaining a voltage sensing operation of FIG. 3 according to a second embodiment.

FIG. 6 is a flowchart showing a method of driving a light driving apparatus step by step according to another embodiment.

FIG. 7 is a view for explaining a voltage sensing operation of FIG. 6 according to a first embodiment.

FIGS. 8 and 9 are views showing modified examples of a falling section of FIG. 7.

FIG. 10 is a view for explaining a voltage sensing operation according to another exemplary embodiment.

FIG. 11 is a flowchart showing a method of storing voltage information in a sense section step by step according to an embodiment.

FIG. 12 is a top view of a vehicle to which a lamp having a light driving device according to an embodiment is applied.

FIG. 13 is an example in which a light driving device according to an embodiment is disposed in front of a vehicle.

FIG. 14 is an example in which a light driving apparatus according to an embodiment is disposed in rear of a vehicle.

BEST MODE

Hereinafter, embodiments of the present invention will be described in detail with reference to the accompanying drawings.

However, the spirit and scope of the present invention is not limited to a part of the embodiments described, and may be implemented in various other forms, and within the spirit and scope of the present invention, one or more of the elements of the embodiments may be selectively combined and substituted for use.

In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art.

Further, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements. Further, when expressed as "on (over)" or "under (below)", it may include not only the upper direction but also the lower direction based on one element.

FIG. 1 is a block diagram showing a configuration of a light driving apparatus according to an embodiment.

Referring to FIG. 1, the light driving apparatus may include a light part 110, a driving part 120, a first sensing part 130, a second sensing part 140, a counting part 150, and a control part 160.

The light part 110 may include at least one light emitting diode. When the light part 110 includes a plurality of light emitting diodes, the plurality of light emitting diodes may be connected in series or in parallel. The light part 110 may include a package in which a light emitting diode chip is packaged. The light emitting diode chip may emit at least one of blue, red, green, ultraviolet (UV), and infrared light. The light part 110 may be mounted on a vehicle to constitute a lamp. For example, one or more light parts 110 may be disposed in at least one of the front, rear, and side of the vehicle. For example, the light part 110 may be applied to a front lamp of a vehicle. For example, the light part 110 may perform at least one function of a head lamp, a turn signal lamp, a daytime running light, a high lamp, a low lamp, and a fog lamp by emitting light. For example, the light part 110 may provide additional functions such as a welcome lamp or a celebration effect by emitting light in conjunction with the opening of a vehicle door. For example, the light part 110 may be applied to a rear lamp that performs at least one function of a side lamp, a brake lamp, and a turn signal lamp by emitting light.

The light part 110 may be driven by an applied current. For example, a pulse-type current may be applied to the light driving apparatus from a main control module (not shown). For example, a pulse width modulation (PWM) type current may be applied to the light driving apparatus. The main control module may be a module that controls a specific main lamp among a plurality of lamps provided in the vehicle. For example, the main control module may be a head lamp control module (HCM) that controls head lamps, but is not limited thereto. In addition, although it has been described above that the current output from a separate module is applied to the light part 110 of the light driving apparatus, it is not limited thereto. For example, the light driving apparatus further includes a power conversion module (not shown) that is connected to a vehicle battery (not shown) and generates a current for driving the light part 110 based on a voltage supplied by discharging the battery.

The light part 110 may be driven by the applied current to output light of a specific color and specific brightness. When the light part 110 includes a plurality of light emitting diodes, the plurality of light emitting diodes may be simultaneously turned on and turned off. For example, the plurality of light emitting diodes may be simultaneously turned on by being driven by an applied current, and turned off simultaneously when the current is blocked. Alternatively, the plurality of light emitting diodes may be sequentially turned on. For example, the plurality of light emitting diodes may be turned on in stages at predetermined time intervals for an animation effect. For example, when the plurality of light emitting diodes include first to third light emitting diodes, the first light emitting diode may emit light at a first point, and the second light emitting diode may emit light at a second point later than the first point, and the third light emitting diode may emit light at a third point later than the second point. That is, the first to third light emitting diodes emit light at regular time intervals, and all of the light emitting diodes may emit light at the third point. In addition, the first to third light emitting diodes may be simultaneously turned off at a fourth point later than the third point.

That is, the light part 110 can be applied to one of various lamps provided in a vehicle, and can emit light under different conditions depending on the type of lamp applied.

The driving part 120 may be connected to an input terminal of the light part 110. For example, the driving part 120 may be connected to an anode (−) of the light emitting diode constituting the light part 110.

The driving part 120 may perform a switching operation according to a control signal to adjust the strength of current applied to the light part 110. For example, the driving part 120 may include a switching element that performs a switching operation. For example, the driving part 120 may include a switching device such as a Bipolar Junction Transistor (BJT) or a Metal Oxide-Semiconductor Field Effect Transistor (MOSFET). The driving part 120 may adjust the strength of the current applied to the light part 110 according to the switching operation of the switching device. For example, the control signal may be a PWM signal, and the driving part 120 may adjust the strength of current applied to the light part 110 by PWM control.

The first sensing part 130 may be disposed at an input terminal of the light driving apparatus. For example, the first sensing part 130 may be disposed at an input terminal of the light part 110. For example, the first sensing part 130 may be connected to an anode of a light emitting diode. The first sensing part 130 may be a current sensor. The first sensing part 130 may sense current and output information of the sensed current. That is, the first sensing part 130 may sense whether current is applied to the light part 110 or whether the applied current is blocked. The first sensing part 130 may transfer the sensed current information to the control part 160.

The second sensing part 140 may be disposed at an output end of the light driving apparatus. For example, the second sensing part 140 may be disposed at an output terminal of the light part 110. For example, the second sensing part 140 may be connected to a cathode of a light emitting diode. The second sensing part 140 may sense a voltage of the light part 110. For example, the second sensing part 140 may sense an output voltage of the light part 110. To this end, the second sensing part 140 may be configured as a voltage sensor. The second sensing part 140 may sense the output voltage of the light part 110 and transmit voltage information corresponding thereto to the control part 160.

In one embodiment, the second sensing part 140 may be activated or inactivated according to a control signal from the control part 160. In an activated state, the second sensing part 140 may sense the output voltage of the light part 110 and transmit voltage information corresponding thereto to the control part 160. In this case, the second sensing part 140 may perform an operation of sensing the output voltage of the light part 110 according to a predetermined period in an active state. In addition, the second sensing part 140 may not perform an operation of sensing the output voltage of the light part 110 in an inactive state.

In another embodiment, the second sensing part 140 may always maintain an active state, and accordingly, may perform an operation of sensing the output voltage of the light part 110 according to a predetermined period.

Meanwhile, a period in which the output voltage of the light part 110 is sensed by the second sensing part 140 may be 2 ms, but is not limited thereto. For example, the second sensing part 140 may sense and output the output voltage of the light part 110 according to a period of 2 ms.

Alternatively, the second sensing part 140 may always perform an operation of sensing the output voltage of the light part 110 regardless of the period. In addition, the control part 160 may read voltage information sensed by the second sensing part 140 according to a period (eg, 2 ms).

A counting part 150 may count time. For example, the counting part 150 may count time based on a specific point according to a control signal of the control part 160.

For example, the counting part 150 may count an elapsed time from the start point at which current is applied to the light part 110. This is to solve an error occurring as the voltage information is obtained in a voltage rising section of the start point. For example, the counting part 150 may count an elapsed time from a point where the voltage information of the light part 110 is obtained. This is to solve an error that occurs as the voltage information is obtained in a voltage falling section that occurs based on an end point at which the current applied to the light part 110 is blocked.

The control part 160 may generally control an operation of the light driving apparatus.

For example, the control part 160 may control a condition of the current applied to the light part 110 based on a driving condition of the light part 110. The condition for the current may include whether or not the current is applied and a strength of the applied current.

For example, the control part 160 may control the driving part 120 so that a current of a certain strength is applied to the light part 110 under the condition that the light part 110 is turned on. To this end, the control part 160 may output a control signal (eg, a PWM signal) for controlling a switching state of a switching device constituting the driving part 120.

In addition, the control part 160 may control the driving part 120 based on the output voltage of the light part 110 obtained through the second sensing part 140. For example, when the output voltage of the light part 110 is different from a target voltage, it may output a control signal to the driving part 120 to make the target voltage and the output voltage equal.

In addition, the control part 160 may detect an abnormal state of the light part 110 based on the output voltage of the light part 110 obtained through the second sensing part 140. The abnormal state of the light part 110 may include a short state and an open state of the light emitting diode constituting the light part 110. For example, an output voltage of the light part 110 may exist within a predetermined reference range in a state in which the light part 110 emits light. In this case, when the light emitting diode constituting the light part 110 is in a short circuit state, the output voltage of the light part 110 has a value lower than the reference range (eg, 0V or a low voltage state). In addition, when the light emitting diode constituting the light part 110 is in an open state, the output voltage of the light part 110 has a value higher than the reference range (eg, an overvoltage state). Accordingly, the control part 160 can determine the open state or short state of the light part 110 based on the output voltage of the light part 110 obtained through the second sensing part 140.

Meanwhile, the control part 160 may not perform an operation of sensing the output voltage of the light part 110 in a specific section.

In general, the control part 160 determines the open or short of the light part 110 based on the output voltage of the light part 110 in a section where current is applied to the light part 110 (eg, current on section). However, as described above, the voltage of the light part 110 gradually increases or decreases with a certain slope at a start point where the current is applied to the light part 110 or an end point where the current applied to the light part 110 is blocked. In addition, when the output voltage of the light part 110 is sense in a section (voltage rising section or voltage falling section) in which the output voltage of the light part 110 increases or decreases with a certain slope, even though the light part 110 is in a normal state, a problem of erroneously detecting it as an open state or a short state may occur. Therefore, the control part 160 does not sense the output voltage of the light part 110 during the voltage rising section or voltage falling section at the start point or end point.

Hereinafter, it will be described in detail a sensing operation of the output voltage of the light part 110 by the control part 160.

FIG. 2 is a view showing a relationship between an input current of a light part and an output voltage of a light part according to an embodiment.

Referring to FIG. 2, current may be applied to the light part 110. The current may be applied in a pulse form. Accordingly, the light part 110 has a current on section to which current is applied and a current off section to which the applied current is blocked. In the current on section, a constant current is applied to the light part 110, and thus the light part 110 may emit light. In addition, the current applied to the light part 110 is blocked in the current off section, and thus the light part 110 may be turned off.

Specifically, in one embodiment, the light part 110 may be applied to a turn signal lamp of a vehicle. Accordingly, the light part 110 may perform a light emitting operation with a predetermined period. For example, the light part 110 may emit light and turn off with a cycle of 400 ms. That is, the light part 110 performs a light emission operation for 400 ms, and then performs a light off operation for 400 ms, and may repeatedly perform such an operation.

Meanwhile, the current on section may include a start point (SP: Start Point) at which current is applied and an end point (EP: End Point) at which the applied current is blocked.

For example, the current on section may start at the first point T1. That is, the first point T1 may be a start point SP at which current is applied to the light part 110.

Then, the current starts to be applied to the light part 110 at the first point T1 corresponding to the start point SP, and accordingly, the output voltage of the light part 110 may have a value greater than zero. In this case, the output voltage of the light part (110) does not have a value corresponding to a reference range immediately at the first point T1, and gradually increases over a certain period of time. In addition, the output voltage of the light part 110 may have a value corresponding to the reference range at a second point T2 after a predetermined time has elapsed from the first point T1. For example, the output voltage of the light part 110 may include a rising section (RS: Rising Section) corresponding to a section between the first point T1 and the second point T2. The rising section RS may also be referred to as a voltage stabilization section or a first voltage bouncing section in which the output voltage of the light part 110 changes to finally have a value corresponding to a reference range.

Meanwhile, the current applied to the light part 110 may have a value of zero (0) at a fourth point T4 corresponding to the end point EP.

In this case, the output voltage of the light part 110 does not have a zero value immediately at the fourth point T4, and gradually decreases over a period of time.

For example, the output voltage of the light part 110 may gradually decrease with a predetermined slope at a third point T3 which is a predetermined time before the fourth point T4. In addition, the output voltage of the light part 110 may decrease at a third point T3 faster than the fourth point T4 and have a zero value at the fourth point T4.

That is, the output voltage of the light part 110 may include a falling section (FS: Falling Section) that corresponds between the third point T3 and the fourth point T4 and gradually decreases with a certain slope.

As described above, the output voltage (LED Voltage) of the light part 110 does not immediately change in response to the input current (Current) of the light part 110, but gradually decreases over a period of time in a rising section RS (or first voltage bouncing section) and falling section FS (or second voltage bouncing section).

And, when the output voltage of the light part 110 is sensed in the rising section RS and the falling section FS as described above, even though the light part 110 is in a substantially normal state, an open state or short circuit state may be erroneously sensed.

Therefore, the control part 160 does not perform a sensing operation for the output voltage of the light part 110 in the rising section RS and falling section FS of the output voltage of the light part 110, and this allows it to resolve erroneously sensed.

Hereinafter, it will be described in detail the output voltage sensing operation of the light part 110 performed according to the change in the output current of the light part 110 by the control part 160.

FIG. 3 is a flowchart showing a method of driving a light driving apparatus step by step according to an embodiment.

Referring to FIG. 3, the control part 160 determines whether a current of a certain strength or more is applied to the light part 110 (S101). That is, the control part 160 can sense an input current value of the light part 110 output through the first sensing part 130. In addition, the control part 160 may determine whether a current on section is based on the input current value. For example, the control part 160 may detect a start point SP at which a constant current is applied to the light part 110 based on the input current value. In this case, the control part 160 does not perform a sensing operation for the output voltage of the light part 110 through the second sensing part 140.

When the start point SP where a constant current is applied to the light part 110, the control part 160 may control the counting part 150 to count an elapsed time from the starting point SP (S102).

The control part 160 determines whether the elapsed time counted through the counting part 150 has passed a preset first de-bouncing time (S103). Here, the first de-bouncing time may be set in various ways according to an embodiment. For example, the first de-bouncing time may be set to correspond to a rising section RS of the output voltage of the light part 110. This will be described in detail below.

When the elapsed time counted through the counting part 150 has not passed the first de-bouncing time, the control part 160 maintains the voltage sensing function OFF, and returns to the above step S102 after waiting for a certain period of time (S104).

In addition, the control part 160 may turn on the voltage sensing function when the elapsed time counted through the counting part 150 passes a preset first de-bouncing time (S105).

Here, the turn on of the voltage sensing function may be as follows.

(1) The turn on of the voltage sensing function may mean changing the second sensing part 140 from an inactive state to an active state. That is, the second sensing part 140 may not operate in an inactive state and may operate in an active state.

(2) The turn on of the voltage sensing function may mean that the control part 160 senses (or reads) voltage information output through the second sensing part 140. That is, the control part 160 may not sense or read voltage information output through the second sensing part 140 in a state in which the voltage sensing function is turned off. Further, it can sense or read voltage information sensed through the second sensing part 140 at a point where the voltage sensing function is turned on.

Next, the control part 160 may monitor a change in input current of the light part 110 sensed through the first sensing part 130 while the voltage sensing function is turned on. Then, the control part 160 may determine whether the input current of the light part 110 is turned off (eg, zero value) (S106). For example, the control part 160 may detect an end point EP at which the current applied to the light part 110 is blocked based on the input current value.

In addition, the control part 160 may continue to perform a voltage sensing operation for sensing the output voltage of the light part 110 for each period when it is not an end point EP at which the current is blocked (S107).

Then, the control part 160 may delete the voltage information sensed during the second de-bouncing time before the end point EP when the input current of the light part 110 is turned off (S108).

Hereinafter, the first de-bouncing time and the second de-bouncing time will be described in detail.

FIG. 4 is a view for explaining a voltage sensing operation of FIG. 3 according to a first embodiment.

Referring to FIG. 4, a current may be applied at a start point SP in a current on section of the light part 110, and the applied current may be blocked at an end point EP. That is, the input current of the light part 110 may be applied at a first point (T1) and blocked at a fourth point (T4).

In this case, as described above, the output voltage of the light part 110 has a rising section RS from the first point (T1) to the second point (T2). In addition, the output voltage of the light part 110 has a falling section FS between a fourth point (T4) and a third point (T3) before the fourth point (T4).

In this case, the sensing operation (Detect time in FIG. 4) may be performed by the control part 160 in a current on section where current is applied to the light part 110.

Specifically, a section in which the voltage sensing operation of the control part 160 is turned on (the detect ON section in FIG. 4) may be smaller than the current on section. That is, the control part 160 may perform a sensing operation of sensing the output voltage of the light part 110 only in some section of the current on section in which current is applied to the light part 110.

For example, the control part 160 may not perform a sensing operation of sensing the output voltage of the light part 110 during a first De-Bouncing Time (DBT) based on the first point T1. In this case, the first DBT in the first embodiment may be set based on a rising section RS of the output voltage of the light part 110. For example, the first DBT may be the same as a time during which the rising section RS proceeds. That is, the first DBT in the first embodiment may mean from the first point T1 to the second point T2. For example, the first DBT may mean from a start point to an end point of the rising section RS.

In addition, the control part 160 may delete voltage information sensed during the second DBT before the fourth point T4 based on the fourth point T4. In this case, the second DBT in the first embodiment may be set based on a falling section FS of the output voltage of the light part 110. For example, the second DBT may be the same as a time during which the falling section (RS) proceeds. That is, the second DBT in the first embodiment may mean from the third point (T3) to the fourth point (T4). For example, the second DBT may mean from a start point (T3) to an end point (T4) of the falling section FS.

Meanwhile, when the first DBT is set to correspond to the rising section RS and the second DBT is set to correspond to the falling section FS as described above, it may not be possible to adapt to various power environments. For example, the time during which the rising section RS or falling section FS proceeds may increase depending on the power environment. In this case, the voltage sensing on section set by the first DBT or the second DBT may not completely exclude the rising section RS or the falling section FS.

FIG. 5 is a diagram for explaining a voltage sensing operation of FIG. 3 according to a second embodiment.

Referring to FIG. 5, a current may be applied to the light part 110 at a start point SP in a current on section, and the applied current may be blocked at an end point EP.

That is, the input current of the light part 110 may be applied at the first point T1a and blocked at the sixth point T6a.

In addition, the output voltage of the light part 110 has a rising section RS from a first point (T1a) to a second point (T2a). In addition, the output voltage of the light part 110 has a falling section FS between a sixth point (T6a) and a fifth point (T5a) before the sixth point (T6a). In addition, a section where the voltage sensing operation of the control part 160 is turned on (detect ON section in FIG. 5) may be smaller than the current on section. That is, the control part 160 may perform a sensing operation of sensing the output voltage of the light part 110 only in some section of the current on section in which current is applied to the light part 110.

For example, the control part 160 may not perform a sensing operation of sensing the output voltage of the light part 110 for a first De-Bouncing Time (DBT) based on the first point T1a. In this case, the first DBT in the second embodiment may be set higher than the rising section RS of the output voltage of the light part 110. For example, the first DBT may be greater than a time during which the rising section RS proceeds. That is, the first DBT in the second embodiment may mean from the first point T1a to the third point T3a. The third point T3a may be after the second point T2a. The third point T3a may be positioned between the second point T2a and the fifth point T5a. The first DBT may be set to 1.5 to 2 times the time during which the rising section RS proceeds. When the first DBT is less than 1.5 times the time during which the rising section RS proceeds, this may cause a situation in which the output voltage of the light part 110 is sensed within the rising section RS. When the first DBT is greater than twice the time during which the rising section RS proceeds, it can reduce the section in which the voltage sensing operation by the control part 160 is performed in the current-on section, and accordingly, it may reduce sensing reliability.

In addition, the control part 160 may delete voltage information sensed during the second DBT prior to the sixth point T6a based on the sixth point T6a. In this case, the second DBT in the second embodiment may be greater than the falling section FS of the output voltage of the light part 110. That is, the second DBT in the second embodiment may mean from the fourth point T4a to the sixth point T6a. The fourth point T4a may be before the fifth point T5a. The fourth point T4a may be between the third point T3a and the fifth point T5a.

Meanwhile, in the above description, the falling section FS starts before the input current to the light part 110 is turned off and ends at a point where the input current is turned off, but is not limited thereto. For example, the falling section FS may be variously changed according to the specifications of the light part 110 or the power environment. This will be described in detail below.

FIG. 6 is a flowchart showing a method of driving a light driving apparatus step by step according to another embodiment.

Referring to FIG. 6, the control part 160 determines whether a current of a certain strength or more is applied to the light part 110 (S201). That is, the control part 160 can sense the input current value of the light part 110 output through the first sensing part 130. In addition, the control part 160 may determine whether a current on section is based on the input current value. For example, the control part 160 may detect a start point SP at which a constant current is supplied to the light part 110 based on the input current value. In this case, the control part 160 does not sense the output voltage of the light part 110 through the second sensing part 140.

When the starting point (SP) where a constant current is supplied to the light part 110, the control part 160 may control the counting part 150 to count an elapsed time from the start point SP (S202). The counting part 150 counts the elapsed time from the start point SP according to the control signal of the control part 160.

The control part 160 determines whether the elapsed time counted through the counting part 150 has passed a preset first de-bouncing time (S203).

When the elapsed time counted through the counting part 150 has not passed the preset first de-bouncing time, the control part 160 may maintain the voltage sensing function off and return to the above step S202 after waiting for a certain period of time (S204).

In addition, the control part 160 resets the previously stored voltage information during a reset time (RT: Reset Time) when the elapsed time counted through the counting part 150 elapses the preset first de-bouncing time (S205). That is, a difference from FIG. 3 is as follows. In FIG. 3, when the first de-bouncing time elapses, the voltage sensing function is immediately turned on. Alternatively, an additional reset section is included in FIG. 6, and the previously stored voltage sensing information is reset during the reset time RT in the reset section.

Then, the control part 160 may turn on the voltage sensing function after the reset time RT has elapsed (S206).

Next, the control part 160 may monitor a change in input current of the light part 110 sensed through the first sensing part 130 while the voltage sensing function is turned on. Then, the control part 160 may determine whether the input current of the light part 110 is blocked (eg, zero value) (S207). For example, the control part 160 may detect an end point EP at which the current applied to the light part 110 is blocked based on the input current value.

Then, the control part 160 may continue to perform a voltage sensing operation for sensing the output voltage of the light part 110 for each period when it is not the end point EP where the applied current is blocked (S208).

Then, the control part 160 may delete the voltage information sensed during the second de-bouncing time before the end point EP when the input current of the light part 110 is turned off (S209).

FIG. 7 is a view for explaining a voltage sensing operation of FIG. 6 according to a first embodiment.

Referring to FIG. 7, a current may be applied at a start point SP in a current on section to the light part 110, and the applied current may be blocked at an end point EP.

That is, the input current of the light part 110 may be applied at the first point T1$b$ and blocked at the seventh point T7$b$.

In addition, the output voltage of the light part 110 has a rising section RS from a first point T1$b$ to a second point T2$b$. In addition, the output voltage of the light part 110 has a falling section FS between the seventh point T7$b$ and the sixth point T6$b$ before the seventh point T6$b$. In addition, a section in which the voltage sensing operation of the control part 160 is turned on (detect ON section in FIG. 7) may be smaller than the current on section. That is, the control part 160 may perform a sensing operation of sensing the output voltage of the light part 110 only in some section of the current on section in which current is applied to the light part 110.

For example, the control part 160 may not perform a sensing operation of sensing the output voltage of the light part 110 during a first De-Bouncing Time (DBT) based on the first point T1$b$. The first DBT may be greater than a time during which the rising section RS proceeds. That is, the first DBT may mean from the first point T1$b$ to the third point T3$b$. The third point T3$b$ may be after the second point T2$b$. The third point T3$b$ may be positioned between the second point T2$b$ and the fifth point T5$b$. The first DBT may be set to 1.5 to 2 times the time during which the rising section RS proceeds. When the first DBT is less than 1.5 times the time during which the rising section RS proceeds, this may cause a situation in which the output voltage of the light part 110 is sensed within the rising section RS. When the first DBT is greater than twice the time during which the rising section RS proceeds, it can reduce the section in which the voltage sensing operation by the control part 160 is performed in the current-on section, and accordingly, it may reduce sensing reliability.

In addition, the control part 160 may count a predetermined reset time based on the third point T3$b$ at which the first DBT has elapsed. That is, the control part 160 sets the reset section from the third point T3$b$ to the fourth point T4$b$ at which the preset reset time has elapsed and disables the voltage sensing function during the reset time RT in the reset section. That is, the voltage sensing function may not accurately turn on in synchronization with the point at which the first DBT has elapsed depending on circumstances. For example, a situation in which the voltage sensing function is turned on may occur before the first DBT elapses. In addition, the passing of the first DBT means that a current on section of a new cycle has arrived. Therefore, the embodiment provides a reset time RT after the first DBT has elapsed, and resets the previously sensed and stored voltage information. In addition, it is possible to prevent a situation in which the voltage sensing function is turned on before the first DBT elapses according to the reset of the voltage information, thereby improving reliability.

In addition, the control part 160 may delete voltage information sensed during the second DBT before the seventh point T7$b$ based on the seventh point T7$b$. The second DBT may be greater than the falling section FS of the output voltage of the light part 110. That is, the second DBT in the second embodiment may mean from the fifth point T5$b$ to the seventh point T7$b$.

FIGS. 8 and 9 are views showing modified examples of a falling section of FIG. 7.

Meanwhile, in the above description, the falling section FS starts before the input current to the light part 110 is turned off and ends at the point where the input current is turned off, but is not limited thereto. For example, the falling section FS may be variously changed according to specifications of the light part 110 or power environment. That is, the falling section may change according to various environments as shown in FIGS. 8 and 9.

FIG. 8 has a difference in the fifth to seventh points T5$c$, T6$c$ and T7$c$ compared to FIG. 7, and only this will be described.

Referring to FIG. 8, the falling section FS may start at a sixth point T6$c$ corresponding to the end point EP at which the current on section ends, and may end at a seventh point T7$c$ later than the sixth point. Accordingly, the control part 160 may delete voltage information obtained between the fifth point T5$c$ before the sixth point T6$c$ based on the sixth point T6$c$. That is, the control part 160 may delete previously obtained voltage information during the second DBT before the sixth point based on the sixth point T6$c$.

FIG. 9 has a difference in the fifth to eighth points T5*d*, T6*d*, T7*d* and T8*d* compared to FIG. 7, and only this will be described.

Referring to FIG. 9, The falling section FS may start at the sixth point T6*d* before the seventh point T7*d* corresponding to the end point EP at which the current on section ends, and end at the eighth point T8*d* after the seventh point T7*d*.

Accordingly, the control part 160 may delete voltage information obtained between the fifth point T5*d* before the seventh point by a predetermined time based on the seventh point T7*d*. That is, the control part 160 may delete voltage information obtained during the second DBT before the seventh point based on the seventh point T7*d*. In this case, the fifth point T5*d* may be earlier than the sixth point T6*d* at which the falling section FS starts.

In conclusion, the voltage sensing on section in the embodiment starts after the rising section RS ends and may end before the falling section FS starts. Accordingly, The embodiment can solve a problem in which sensing errors may occur as voltage sensing operations are performed in the rising section RS and the falling section FS.

FIG. 10 is a view for explaining a voltage sensing operation according to another exemplary embodiment.

FIG. 10 may correspond to a case where a light emitting operation of the light part 110 is different from that of FIG. 7. That is, the light part 110 in FIG. 7 can perform a flickering operation with a certain period. In addition, the light part 110 in FIG. 10 shows a case in which the number of light emitting diodes emitting light increases with time in an animation manner.

Referring to FIG. 10, a current may be applied at a start point SP in a current on section to the light part 110, and the applied current may be blocked at an end point EP.

That is, the input current of the light part 110 may be applied at the first point T1*e* and blocked at the seventh point T7*e*.

In addition, the output voltage of the light part 110 has a rising section RS from a first point T1*e* to a second point T2*e*.

In this case, the output voltage of the light part 110 may not increase with a certain slope in the rising section RS, but may increase in a stepwise manner different from that of FIG. 7, for example. That is, a plurality of light emitting diodes constituting the light part 110 of FIG. 10 may be configured and driven in an animation method in which the number of light emitting diodes operating in an on state gradually increases over time. Accordingly, all light emitting diodes of the light part 110 of FIG. 10 may emit light at the second point T2*e*.

In addition, the output voltage of the light part 110 has a falling section FS between a seventh point T7*e* and a sixth point T6*e* before the seventh point T6*e*. In addition, a section in which the voltage sensing operation of the control part 160 is turned on (detect ON section in FIG. 10) may be smaller than the current on section. That is, the control part 160 may perform a sensing operation of sensing the output voltage of the light part 110 only in some section of the current on section in which current is applied to the light part 110.

For example, the control part 160 may not perform a sensing operation of sensing the output voltage of the light part 110 for a first De-Bouncing Time (DBT) based on the first point T1*e*. The first DBT may be greater than a time during which the rising section RS proceeds. That is, the first DBT may mean from the first point T1*e* to the third point T3*e*. The third point T3*e* may be after the second point T2*e*. The third point T3*e* may be positioned between the second point T2*e* and the fifth point T5*e*. The first DBT may be set to 1.5 to 2 times the time during which the rising section RS proceeds. When the first DBT is less than 1.5 times the time during which the rising section RS proceeds, this may cause a situation in which the output voltage of the light part 110 is sensed within the rising section RS. When the first DBT is greater than twice the time during which the rising section RS proceeds, it can reduce the section in which the voltage sensing operation by the control part 160 is performed in the current-on section, and accordingly, it may reduce sensing reliability.

In addition, the control part 160 may count a predetermined reset time based on the third point T3*e* at which the first DBT has elapsed. That is, the control part 160 sets the reset section from the third point T3*e* to the fourth point T4*e* at which the preset reset time has elapsed and disables the voltage sensing function during the reset time RT in the reset section. That is, the voltage sensing function may not accurately turn on in synchronization with the point at which the first DBT has elapsed depending on circumstances. For example, a situation in which the voltage sensing function is turned on may occur before the first DBT elapses. In addition, the passing of the first DBT means that a current on section of a new cycle has arrived. Therefore, the embodiment provides a reset time RT after the first DBT has elapsed, and resets the previously sensed and stored voltage information. In addition, it is possible to prevent a situation in which the voltage sensing function is turned on before the first DBT elapses according to the reset of the voltage information, thereby improving reliability.

In addition, the control part 160 may delete voltage information sensed during the second DBT before the seventh point T7*e* based on the seventh point T7*e*. The second DBT may be greater than the falling section FS of the output voltage of the light part 110. That is, the second DBT in the second embodiment may mean from the fifth point T5*e* to the seventh point T7*e*.

Meanwhile, the first DBT, the second DBT, and the reset time in the embodiment may be set to different values depending on the type of lamp to which the light part 110 is applied. For example, the light part 110 may include a first turn signal lamp that operates in a flickering manner, a second turn signal lamp that operates in an animation manner, a daytime running lamp, and a vehicle lamp. In addition, the first DBT, the second DBT, and the reset time may be set as shown in Table 1 below.

TABLE 1

| condition | first DBT | Reset time | second DBT |
| --- | --- | --- | --- |
| First turn signal lamp | 80 ms | 5 ms | 25 ms |
| Second turn signal lamp | 190 ms | 5 ms | 25 ms |
| daytime running lamp | 140 ms | 5 ms | 25 ms |
| side lamp | 140 ms | 5 ms | 25 ms |

As shown in Table 1, the first DBT, the second DBT, and the reset time in the embodiment can be set to different values according to the type of lamp to which the light part 110 is applied, and accordingly, it can improve the reliability of the voltage sensing function.

FIG. 11 is a flowchart showing a method of storing voltage information in a sense section step by step according to an embodiment.

Before the description of FIG. 11, the control part 160 may preferentially store the voltage information sensed through the second sensing part 140 in a memory (not shown) and delete voltage information stored during the second DBT before the end point when an end point corresponding to the current block point arrives, as described in FIG. 3. Alternatively, when voltage information is sensed, the embodiment may perform a storage operation of the sensed voltage information after the second DBT has elapsed. For example, when voltage information is sensed, the control part 160 may store the sensed voltage information if the end point corresponding to the current block point does not arrive even if the second DBT has elapsed from the point where the voltage information was sensed. Alternatively, when voltage information is sensed and the end point corresponding to the current block point arrives before the second DBT elapses from the sensed point, the control part 160 may delete the sensed voltage information without updating it to memory.

That is, referring to FIG. 11, the control part 160 may sense voltage information through the second sensing part 140 (S301). In addition, updating of the sensed voltage information in the memory is not performed during the second DBT.

Thereafter, the control part 160 determines whether the second DBT has elapsed from a point where the voltage information was sensed (S302).

Then, the control part 160 determines whether the current applied to the light part 110 is blocked before the second DBT elapses when the second DBT has elapsed from the point where the voltage information was sensed (S303).

Thereafter, the control part 160 deletes the sensed voltage information without updating the memory when the current applied to the light part 110 is blocked before the second DBT elapses from a point at which the voltage information was sensed (S304).

In addition, the control part 160 may store and update the sensed voltage information in memory when the current is continuously applied to the light part 110 even after the second DBT has elapsed from the point where the voltage information was sensed (S305).

Meanwhile, the light driving apparatus according to the embodiment may be applied to a moving device, for example, a vehicle.

FIG. 12 is a top view of a vehicle to which a lamp having a light driving device according to an embodiment is applied, FIG. 13 is an example in which a light driving device according to an embodiment is disposed in front of a vehicle, and FIG. 14 is an example in which a light driving apparatus according to an embodiment is disposed in rear of a vehicle.

Referring to FIGS. 12 to 14, a light driving apparatus according to an embodiment may be applied to a lamp of a vehicle 2000. One or more lamps may be disposed in at least one of the front, rear, and side of the vehicle 2000. The light driving apparatus is provided in various shapes such as a curve or a straight line, and may be applied to lamps disposed in various regions of the vehicle 2000.

For example, referring to FIG. 13, the lamp may be applied to a front lamp 2100 of a vehicle 2000. The front lamp 2100 may include a first cover member 2110 and at least one lamp module including the lighting device 1000. The first cover member 2110 may accommodate the light driving apparatus.

The front lamp 2100 may provide a plurality of functions by controlling a driving point of a light driving apparatus included in at least one lamp module. For example, the front lamp 2100 may include a first lamp module 2120 and a third lamp module 2130 that provides at least one function of a head lamp, a turn signal lamp, a daytime running lamp, a high lamp, a low lamp, and a fog lamp by light emission of the light part 110 of the light driving apparatus. In addition, the front lamp 2100 may provide additional functions such as a welcome lamp or a celebration effect when the driver opens the vehicle door.

In addition, referring to FIG. 14, the lamp may be applied to a rear lamp 2200 of a vehicle. The rear lamp 2200 may include at least one lamp module including a second cover member 2210 and the light driving apparatus. The second cover member 2210 may accommodate the light driving apparatus.

The rear lamp 2200 may provide a plurality of functions by controlling a driving point of the lighting device 1000 included in at least one lamp module. For example, the rear lamp 2200 may include a second lamp module 2220 that provides at least one function of a side lamp, a brake lamp, and a turn signal lamp by light emitted from the light part 110 of the light driving apparatus.

The above embodiment may more accurately sense a state of the light part. Specifically, the embodiment prevents a sensing operation of an output voltage of the light part in a rising section at a start point where the current is applied to the light part and a falling section at an end point where the applied current is blocked. Accordingly, the embodiment can solve a sensing error problem that may occur as the output voltage of the light part is sensed in the rising section and the falling section, and thereby improve reliability.

In addition, the embodiment may provide a lighting driving device applicable in various environments. That is, the embodiment stops the sensing operation of the output voltage of the light part during a first DBT longer than a time of the rising section at the start point at which the current is applied to the light part. In addition, the embodiment stops the sensing operation of the output voltage of the light part during a second DBT longer than a time of the falling section at the end point at which the applied current is blocked. Accordingly, the embodiment can solve a reliability problem that occurs as the rising section or falling section changes in various environments.

In addition, the embodiment may provide a more improved sense function by including a reset section. That is, the embodiment does not immediately start the sensing function of the output voltage of the light part at a point at which the first DBT has passed, but resets the previously stored data for a predetermined reset time based on a point at which the first DBT has passed. Accordingly, the embodiment can further improve the reliability of the sensing function of the light part.

What is claimed is:

1. A light driving apparatus comprising:
 a light part;
 a first sensing part configured to sense an input current value of the light part;
 a second sensing part configured to sense an output voltage value of the light part; and
 a control part configured to sense the output voltage value through the second sensing part based on the input current value sensed through the first sensing part and determine a state of the light part based on the output voltage value;
 wherein the control part is configured to:
 control a sensing operation of the output voltage value through the second sensing part to start after a first de-bouncing time has elapsed from a start point in which current is applied to the light part, and
 control the sensing operation of the output voltage value through the second sensing part to stop before a second de-bouncing time from an end point at which the current applied to the light part is blocked.

2. The light driving apparatus of claim 1, wherein the output voltage of the light part includes:
a rising section that increases based on the start point at which current starts to be applied to the light part, and
a falling section that the decreases based on the end tine at which the applied current is block,
wherein the first de-bouncing time is set based on the rising section, and
wherein the second de-bouncing time is set based on the falling section.

3. The light driving apparatus of claim 2, wherein the output voltage of the light part gradually increases with a certain slope in the rising section, and
wherein the output voltage of the light part gradually decreases with a certain slope in the falling section.

4. The light driving apparatus of claim 2, wherein the output voltage of the light part increases step by step at a regular time interval in the rising section, and
wherein the output voltage of the light part decreases step by step at a regular time interval in the falling section.

5. The light driving apparatus of claim 2, wherein a point at which the first de-bouncing time elapses is later than a point at which the rising section ends.

6. The light driving apparatus of claim 2, wherein a point at which the first de-bouncing time elapses is the same as a point at which the rising section ends.

7. The light driving apparatus of claim 2, wherein a point before the second de-bouncing time from the end point is earlier than a point at which the falling section starts.

8. The light driving apparatus of claim 2, wherein a point before the second de-bouncing time from the end point is same as a point at which the falling section starts.

9. The light driving apparatus of claim 7, wherein a start point of the falling section is earlier than the end point at which the current applied to the light part is blocked.

10. The light driving apparatus of claim 1, wherein when the first de-bouncing time elapses, the control part is configured to control the sensing operation of the output voltage value through the second sensing part to start after a predetermined reset time from a point at which the first debouncing time has elapsed.

11. The light driving apparatus of claim 10, wherein the control part is configured to reset voltage information previously stored in a memory during the reset time.

12. The light driving apparatus of claim 1, wherein the control part is configured to:
store voltage information corresponding to the sensed output voltage value in a memory, and
delete information stored during the second de-bouncing time before the end point among information stored in the memory when the end point at which the current applied to the light part is blocked arrives.

13. The light driving apparatus of claim 1, wherein the control part is configured to:
obtain voltage information corresponding to the output voltage value through the second sensing part, and
update the obtained voltage information in a memory when the end point arrives after the second de-bouncing time has elapsed from a point of obtaining the voltage information.

14. The light driving apparatus of claim 13, wherein the control part is configured to delete the obtained voltage information when the end point arrives before the second de-bouncing time elapses from a point of obtaining the voltage information.

15. The light driving apparatus of claim 1, further comprising:
a counting part configured to count an elapsed time from the start point according to a control of the control part and count an elapsed time from a point at which the output voltage value of the light part is sensed through the second sensing part.

16. A method for driving a light comprising:
sensing an input current value of a light part;
counting a first elapsed time from a start point at which current is applied to the light part based on the sensed input current value;
sensing an output voltage value of the light part when the first elapsed time passes a predetermined first de-bouncing time;
counting a second elapsed time from when the output voltage value is sensed;
determining an end point at which the current applied to the light part is blocked based on the input current value of the light part;
deleting voltage information corresponding to the sensed output voltage value when the end point arrives before the second elapsed time elapses a predetermined second de-bouncing time; and
updating voltage information corresponding to the sensed output voltage value in a memory when the end point arrives after the second elapsed time elapses the second de-bouncing time.

17. The method of claim 16, wherein the output voltage of the light part includes a rising section that increases based on the start point at which current starts to be applied to the light part, and
wherein a point at which the first de-bouncing time elapses is later than a point at which the rising section ends.

18. The method of claim 16, wherein the output voltage of the light part includes a falling section that the decreases based on the end tine at which the applied current is block, and
wherein a point before the second de-bouncing time from the end point is earlier than a point at which the falling section starts.

19. The method of claim 16, wherein the sensing of the output voltage value includes:
counting a preset reset time when the first elapsed time elapses after the first de-bouncing time; and
sensing the output voltage value when the counted reset time elapses.

20. The method of claim 19, further comprising:
resetting voltage information previously stored in a memory during the reset time.

* * * * *